United States Patent [19]

Tracy et al.

[11] 4,199,388
[45] Apr. 22, 1980

[54] METHOD FOR MAKING A MULTI-PLY CONTINUOUS FILAMENT BALLISTIC HELMET

[75] Inventors: Henry J. Tracy, Newburyport; David E. Holt, Winchester; Janet E. Tracy, Newburyport, all of Mass.

[73] Assignee: Geonautics, Inc., Newburyport, Mass.

[21] Appl. No.: 909,648

[22] Filed: May 15, 1978

[51] Int. Cl.² .......................... B29D 3/02; B29D 9/00
[52] U.S. Cl. ................................. 156/166; 156/228; 156/245; 264/135; 264/137; 264/258; 264/268; 264/294; 264/320; 264/236; 264/518
[58] Field of Search ............... 264/137, 121, 255, 236, 264/258, 347, 257, 250, 267, 266, 265, 320, 324, 268, 553, 248, 135, 294, 518; 156/166, 180, 224, 62.2, 62.8, 167; 2/142, 412, 2.5, 6, 410, 411, 425

[56] References Cited

U.S. PATENT DOCUMENTS

| | | | |
|---|---|---|---|
| 2,566,960 | 9/1951 | Phillips | 264/109 |
| 2,688,580 | 9/1954 | Fingerhut | 264/257 |
| 2,956,916 | 10/1960 | Voss et al. | 264/258 |
| 2,964,442 | 12/1960 | Hansen | 264/258 |
| 3,001,900 | 9/1961 | Frieder et al. | 2/412 |
| 3,018,210 | 1/1962 | Frieder et al. | 2/412 |
| 3,117,055 | 1/1964 | Guandique et al. | 264/210 F |
| 3,320,619 | 5/1967 | Lastnik et al. | 2/6 |
| 3,334,001 | 8/1967 | Tyhurst et al. | 156/228 |
| 3,338,992 | 8/1967 | Kinney | 264/210 F |
| 3,352,954 | 11/1967 | Smith | 264/91 |
| 3,956,447 | 5/1976 | Denommee et al. | 2/6 |
| 4,080,416 | 3/1978 | Howard | 264/257 |
| 4,123,494 | 10/1978 | Evrard et al. | 264/267 |

*Primary Examiner*—W. E. Hoag
*Attorney, Agent, or Firm*—Richard J. Birch

[57] ABSTRACT

Method for making a laminated ballistic helmet from plural, continuous filament resin-coated layers. A continuous filament bundle, yarn or end is deposited on a plurality of different sized helmet-shaped preforms. A resin is coated upon or impregnated into the continuous filament bundle, yarn or end, either before or after deposition. The resulting resin containing preforms are stacked in nested relation and then molded to produce a bonded, laminated ballistic helmet.

20 Claims, 7 Drawing Figures

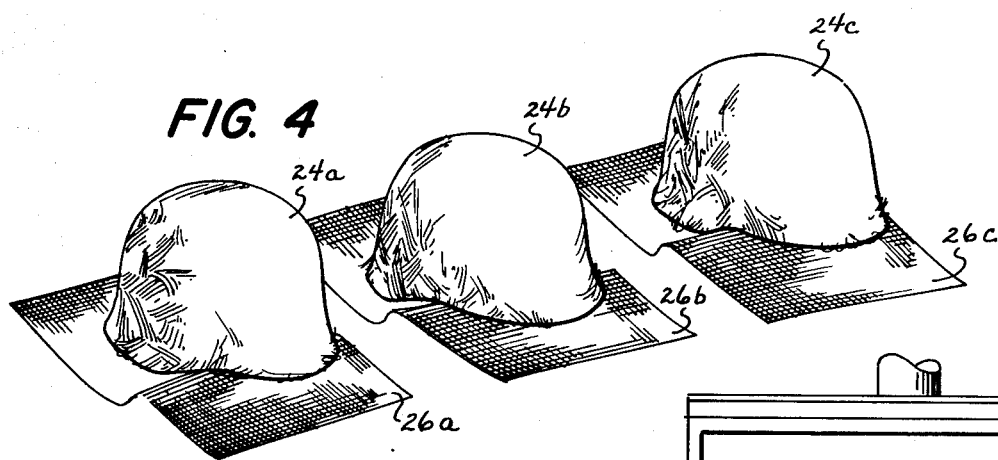
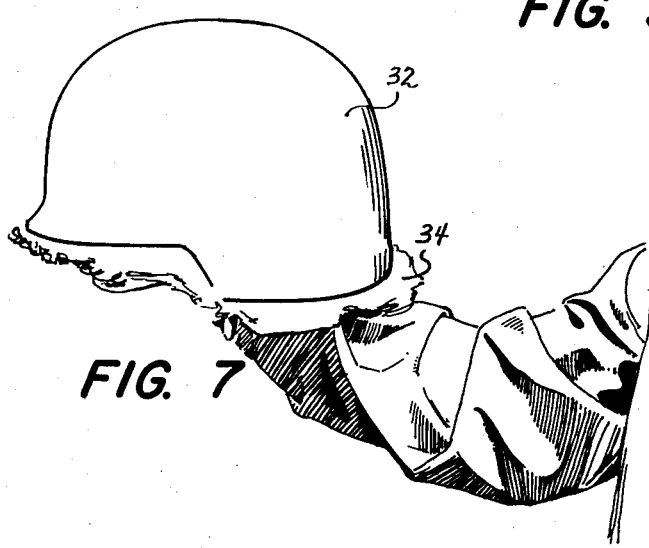
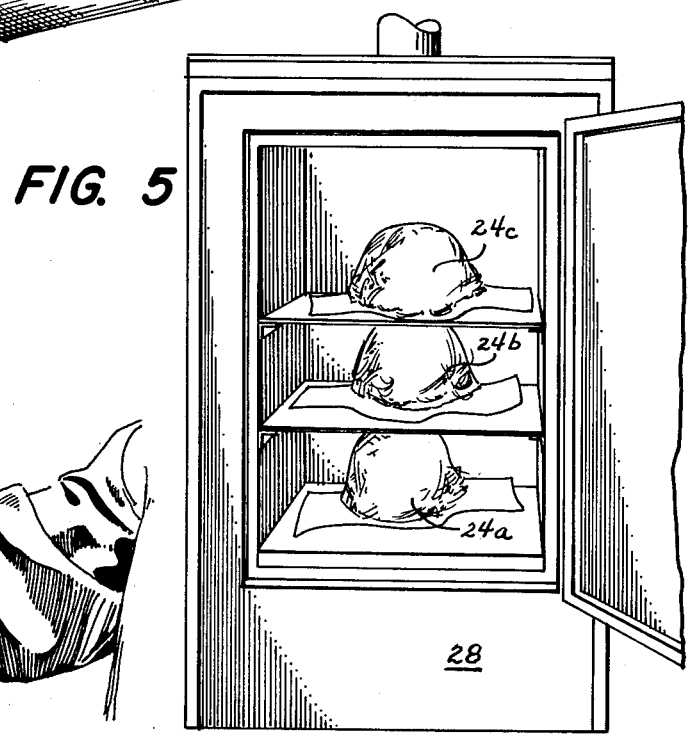
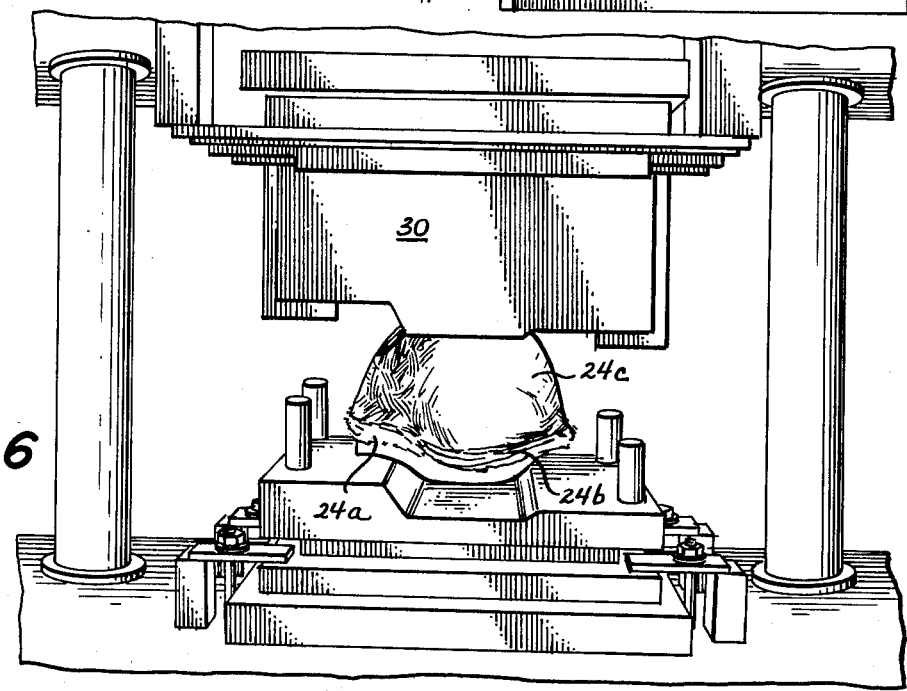

METHOD FOR MAKING A MULTI-PLY CONTINUOUS FILAMENT BALLISTIC HELMET

BACKGROUND OF THE INVENTION

The present invention relates to ballistic helmets in general and, more particularly, to a bonded, laminated, ballistic helmet and method for making same.

Various types of ballistic helmets have been used by military forces and law enforcement agencies in recent years. The ubiquitous metal helmet of WWII has been supplement and, to some degree, replaced by plastic helmets. Unfortunately, plastic helmets having sufficient ballistic integrity are relatively heavy. Recently, it has been proposed to use aramid fibers; such as, E. I. DuPont deNemours & Co., Inc.'s aramid fiber sold under the trademark KEVLAR. Woven KEVLAR was pattern cut and molded into a helmet. This process was not only time consuming, but also expensive because of the wasted scrap material.

It is, accordingly, a general object of the present invention to provide a more economic ballistic helmet and method for making same.

It is a specific object of the invention to provide a laminated, ballistic helmet that is formed from continuous filaments of aramid and/or fiber glass fibers arranged in bundles, yarns and/or ends.

It is another object of the invention to provide a laminated ballistic helmet that is relatively lightweight with sufficient ballistic integrity.

It is a feature of the invention tht the method thereof can be practical using readily available materials and components.

It is another feature of the invention that the process of the invention fully utilizes the helmet material without any significant waste.

It is still another feature of the invention that the method thereof fulfills the need for different-sized helmets.

BRIEF DESCRIPTION OF THE INVENTION

A continuous filament bundle, yarn or end of fibers is deposited on a first helmet-shaped pattern. The continuous filament is coated or impregnated with a resin either before or after deposition of the fiber on the pattern. This operation is repeated with different sized, helmet-shaped patterns to produce a plurality of nestable helmet-shaped preforms. The preforms are then stacked together in nesting relation and molded to produce a bonded, laminated, ballistic helmet.

DESCRIPTION OF THE DRAWINGS

The objects and features described above and other objects and features of the invention will best be understood from a detailed description of a preferred embodiment thereof, selected for purposes of illustration, and shown in the accompanying drawings, in which:

FIG. 4 illustrates in perspective view a plurality of different sized, helmet-shaped preforms in supporting screens;

FIG. 5 is a view in perspective of a forced air, drying oven with three preforms positioned therein;

FIG. 6 is a view in perspective showing the nested preforms positioned in a heated metal, compression mold; and, FIG. 7 is a view in perspective showing the compressed preforms before removal of the flash and prior to molding.

DETAILED DESCRIPTION OF A PREFERRED EMBODIMENT

Turning now to the drawings, there is shown in sequential views a method in accordance with the invention for producing a bonded, laminated ballistic helmet using a continuous filament of fibrous material. In a preferred embodiment, the fibrous material is an aramid fiber such as KEVLAR or a fiber glass fiber.

As used herein, the following terms shall have the meanings set forth below:
1. FILAMENT—the smallest unit of fibrous material;
2. BUNDLE—a collection of essentially parallel filaments;
3. YARN—a twisted bundle of continuous filaments;
4. END—an untwisted bundle of continuous filaments;
5. STRAND—same as END; and
6. ROVING—a number of ends or strands collected into a parallel grouping with little or no twist.

Figure 1:
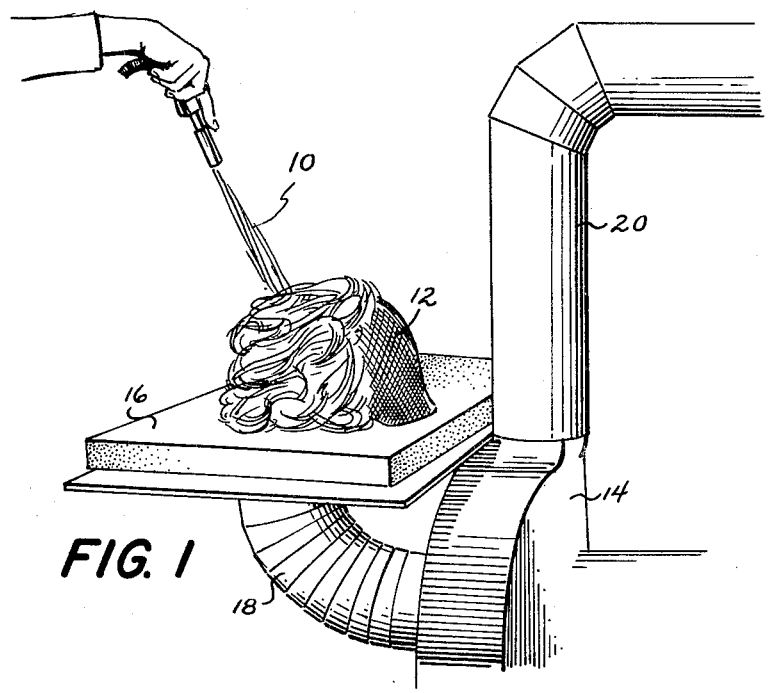
FIG. 1 is a view in perspective showing the deposition of a continuous filament fiber onto a helmet-shaped porous screen.

Referring now to FIG. 1 of the drawings, there is shown in perspective view the deposition of a continuous filament bundle 10 onto a helmet-shaped, porous screen 12. Preferably, a suction is applied to the inside of the porous screen 12 by means of a fan 14 through an apertured support 16 and an inlet pipe 18. The exhaust from fan 14 is discharged through a conventional exhaust pipe 20.

A variety of different methods can be employed for depositing the continuous filament bundle 10 upon the porous, helmet-shaped screen or pattern 12. The deposition can be performed by mechanical rollers (not shown) or by entraining the continuous filament bundle 10 in an airstream from an air gun 22 as depicted in FIG. 1.

Figure 2:
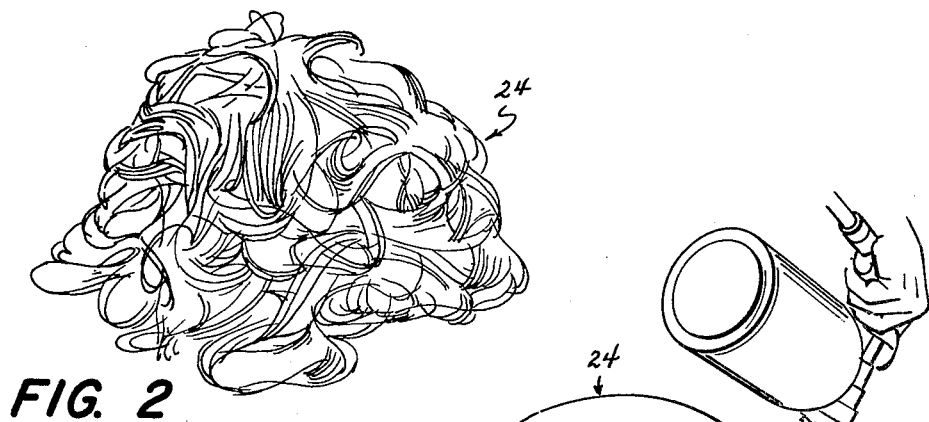
FIG. 2 illustrates in perspective view the continuous filament fiber preform in a dry condition.
Figure 3:
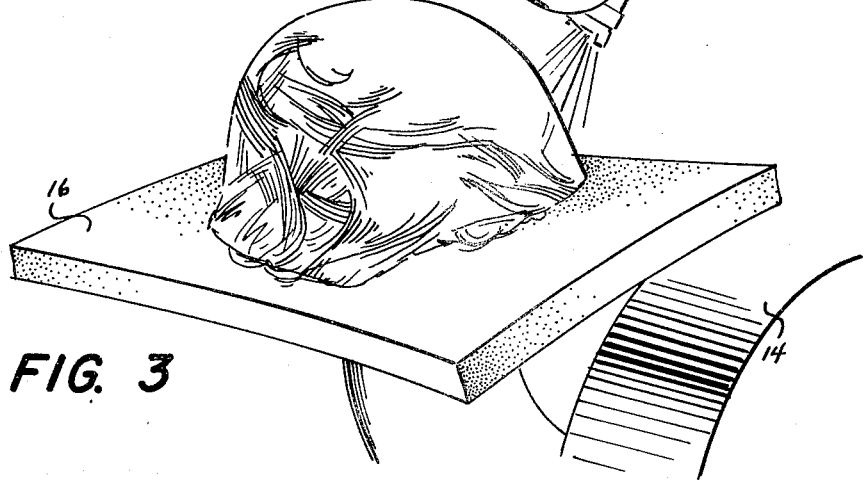
FIG. 3 depicts in perspective view the application of a resinous solution to the dry preform of FIG. 2.

FIG. 2 illustrates in perspective view a continuous filament bundle preform ply 24 produced by depositing the continuous filament bundle 10 upon the helmet-shaped pattern 12 illustrated in FIG. 1. The continuous filament preform ply 24 is shown in FIG. 2 in a dry form. After the deposition formation of the preform ply, a resin, preferably in solution, is applied to the preform ply 24 by spraying as shown in FIG. 3, or by other conventional applicators. It will be appreciated by those skilled in the art that the resin can be coated on or impregnated in the continuous bundle 10, either prior to or after deposition of the bundle on the helmet-shaped pattern 12.

FIG. 4 illustrates in perspective view three different sized continuous filament bundle preform plies 24a, 24b, and 24c that are supported on corresponding porous screens 26a–26c. After application of the resinous solution as shown in FIG. 3, the solvent is allowed to evaporate and the cure of the resin is advanced before stacking the preform plies 24a, 24b, 24c, etc. in nesting relation for subsequent molding. Preferably, the resin containing preform plies 24a through 24c are placed in a heated, air-circulating oven 28, as shown in FIG. 5, for "B" staging and solvent removal.

After oven treatment, the preform plies 24a through 24c are removed from oven 28, assembled in stacked nested relation and placed in a heated, compression mold, indicated generally as 30. At this point, the nested preforms can be molded directly or alternatively, can be precompressed to form a preformed helmet 32, as shown in FIG. 10. If the precompression step is employed, the mold 30 will shear off a portion of the continuous filament bundle preforms, leaving an easily removed flash 34. After removing flash 34, the precompressed, preformed helmet 32 is molded in mold 30 under heat and pressure.

EXAMPLE I

The following example of the production of a bonded, laminated ballistic helmet is presented by way of illustration only. The continuous filament bundles 10 were blown directly onto the helmet-shaped preform screen 12. The resulting preforms were made in varying thicknesses and weight. At the present time, the best compromise appears to be in working with 50-gram (KEVLAR weight) preforms. The preforms were made by blowing a continuous KEVLAR 29 roving (15,000 denier) onto a perforated screen. Air was drawn through the screen at a high velocity, e.g., 100 ft./sec. in order to hold the sprayed continuous fiber in its relative position on the screen. The weight of the KEVLAR being sprayed was accurately determined by prebalancing the KEVLAR roll on a gram balance and offsetting the balance by 50 grams. When the arm balanced, 50 grams had been deposited on the screen.

Deposition of the exact amount of resin was more difficult. The resin used (R799 Lewcott Chemicals, phenolic polyvinyl butyral) was diluted, first on a 4:1 and then on an 8:1 volumetric basis, with denatured ethanol. This solution was sprayed on the preform, using conventional spray equipment. Depending upon the operator, the 8:1 dilution yielded a resifn content in the range of 22 to 27 percent by weight. On the basis of present information, we believe that a resin content by weight of 20 to 30 percent is desirable in order to achieve maximum ballistic characteristics.

Each preform was air-dried in a forced-air oven at 150° F. for a period of four hours. This drying time and temperature appeared to eliminate all traces of alcohol and to give sufficient "B" stage to the phenolic resinous material.

In the initial attempt, twenty preforms of ten different sizes were stacked and placed in the mold for molding. This yielded a KEVLAR content of approximately 1,000 grams on most helmet preforms and slightly less on a finished molded helmet. There was a variation in resin content noted but the molded helmets were determined adequate for the test phase.

The KEVLAR continuous filament of bonded, laminated ballistic helmets set forth were molded at a pressure of approximately 5,000 psi for a period of 45 minutes to one hour at between 270° and 300° F. The molded helmets were deflashed and processed in a conventional manner.

Ballistic tests were conducted using a 17-grain, 22-caliber fragment simulator with a 12" barrel. The test results for the continuous filament KEVLAR fiber are summarized as follows:

| 30 ounce/sq. ft. Areal Density Helmets | | |
|---|---|---|
| Helmet No. | Construction | Average V50 Rating |
| 6 | Continuous Fiber-KEVLAR | 1808 ft. per second |
| 11 | Continuous Fiber-KEVLAR | 1714 ft. per second |

EXAMPLE II

Fabrication and Testing of 38 ounce/sq. ft. Areal Density Helmets

The procedure used in the fabrication of the heavier and thicker 38 ounce Areal Density Helmets was substantially the same as used in Example I with the exception that 25 preform plies were used in the molding. Ballistic tests were conducted exactly as above with the following results:

| 38 ounce/sq. ft. Areal Density Helmets | | |
|---|---|---|
| Helmet No. | Construction | Average V50 Rating |
| 20 | Continuous Fiber-KEVLAR | 2092 ft. per second |
| 21 | Continuous Fiber-KEVLAR | 2041 ft. per second |
| 22 | Continuous Fiber-KEVLAR | 2136 ft. per second |

The above two sets of test results represent satisfactory performance for ballistic helmets.

The average V50 ratings set forth above indicate that the ballistic helmet of the present invention fulfilled the desired ballistic integrity.

It will be appreciated that other synthetic fibers besides KEVLAR can be used either alone or in combination with other synthetic fibers such as, fiber glass and nylon and that fiber glass or nylon alone can be employed to practice the method of the present invention.

Having described in detail a preferred embodiment of our invention, it will now be apparent to those skilled in the art, that numerous modifications can be made therein, without departing from the scope of the invention as defined in the following claims.

What we claim and desire to secure by Letters Patent of the United States is:

1. A method for making a ballistic helmet, comprising the steps of:
   (1) forming plural nestable, helmet-shaped, resin containing preforms, each being made by depositing at least one continuous filament bundle on a helmet-shaped form, coating the continuous filament material with a solvent solution of curable resin and removing the solvent from said solution;
   (2) only partially curing the resin;
   (3) then arranging the preforms in nesting relation in a mold to form a stack of partially cured preforms; and,
   (4) applying heat and pressure to bond said stack of partially cured preforms together by further curing the partially cured resin in the preforms, thereby molding said stack of partially cured preforms into a laminated helmet.

2. The method of claim 1, wherein said plural preforms are produced by depositing a continuous filament bundle onto a plurality of different sized, helmet-shaped forms 3. The method of claim 2, wherein said continuous filament bundle is deposited by blowing it onto the helmet-shaped forms.

4. The method of claim 3, wherein said helmet-shaped forms are porous screens and further comprising the step of applying a suction to the inside of each helmet-shaped porous screen when the continuous filament bundle is blown thereon to temporarily hold the bundle on the screen.

5. The method of claim 4, wherein the continuous filament bundle is blown onto the helmet-shaped forms by entraining the continuous filament bundle in a moving stream of a gas.

6. The method of claim 1, wherein said plural preforms are produced by depositing a continuous filament yarn onto a plurality of different sized, helmet-shaped forms.

7. The method of claim 1, wherein said plural preforms are produced by depositing a continuous filament end onto a plurality of different sized, helmet-shaped forms.

8. The method of claim 1, wherein the resin content of the coated continuous filament bundle is in the range of 20 to 30 percent by weight.

9. The method of claim 1, further comprising the step of precompressing the stack of nested, partially cured preforms before molding.

10. The method of claim 1 wherein said continuous filament material is an aramid fiber.

11. The method of claim 1 further comprising the step of depositing a predetermined quantity of said at least one continuous filament bundle onto the helmet-shaped form.

12. A method for making a ballistic helmet comprising the steps of:
(1) forming plural, nestable, helmet-shaped, resin-containing preforms, each being made by:
   a. depositing on each one of a plurality of different sized, helmet-shaped forms at least one continuous filament bundle;
   b. coating the continuous filament material of the bundle with a solvent solution of a curable resin after the continous filament bundle is deposited onto the helmet-shaped forms and,
   c. removing the solvent from said solution;
(2) partially curing the resin;
(3) arranging subsequently the preforms in nesting relation in a mold to form a stack of partially cured preforms; and,
(4) applying heat and pressure to bond said stack of partially cured preforms together by further curing the partially cured resin in the preforms thereby molding the stack of partially cured preforms into a laminated helmet.

13. The method of claim 12, further comprising the steps of exposing the resin coated continuous filament bundle to a flow of a heated gas to remove the solvent by evaporation and to advance the cure of the resin before stacking the preforms in the nested relation.

14. The method of claim 12, further comprising the step of reducing the flow of the resin to the molding consistency before arranging the preforms in the nested relation.

15. The method of claim 14, further comprising the step of exposing the resin coated continuous filament bundle to a flow of a heated gas.

16. The method of claim 14, wherein the resin content of the coated continuous filament bundle is in the range of 20 to 30 percent by weight.

17. A method for making a ballistic helmet comprising the steps of:
(1) forming plural, nestable, helmet-shaped, resin-containing preforms, each being made by:
   a. depositing on each one of a plurality of different sized, helmet-shaped forms at least one continuous filament;
   b. coating the continuous filament material of the bundle with a solvent solution of a curable resin before the continuous filament bundle is deposited onto the helmet-shaped forms and,
   c. removing the solvent from said solution;
(3) arranging subsequently the preforms in nesting relation in a mold to form a stack of partially cured preforms; and,
(4) applying heat and pressure to bond said stack of partially cured preforms together by further curing the partially cured resin in the preforms thereby molding the stack of partially cured preforms into a laminated helmet.

18. A method for making a ballistic helmet comprising the steps of:
(1) forming plural, nestable helmet-shaped, resin-containing preforms, each being made by:
   a. depositing on each one of a plurality of different sized, helmet-shaped forms at least one continuous filament bundle,
   b. impregnating the continuous filament material of the bundle with a solvent solution of a curable resin after the bundle is deposited onto the helmet-shaped forms and,
   c. removing the solvent from said solution;
(2) partially curing the resin;
(3) arranging subsequently the preforms in nesting relation in a mold to form a stack of partially cured preforms; and,
(4) applying heat and pressure to bond said stack of partially cured preforms together by further curing the partially cured resin in the preforms thereby molding the stack of partially cured preforms into a laminated helmet.

19. A method for making a ballistic helmet comprising the steps of:
(1) forming plural, nestable, helmet-shaped, resin-containing preforms, each being made by:
   a. depositing on each one of a plurality of different sized, helmet-shaped forms at least one continuous filament bundle,
   b. impregnating the continuous filament material of the bundle with a solvent solution of a curable resin before the bundle is deposited onto the helmet-shaped forms and,
   c. removing the solvent from said solution;
(2) partially curing the resin;
(3) arranging subsequently the preforms in nesting relation in a mold to form a stack of partially cured preforms; and
(4) applying heat and pressure to bond said stack of partially cured preforms together by further curing the partially cured resin in the preforms thereby molding the stack of partially cured preforms into a laminated helmet.

20. The method of claim 19 further comprising the steps of exposing the resin impregnated continuous filament bundle to a flow of a heated gas to remove the solvent by evaporation and to advance the cure of the resin before arranging the preforms in the nested relation.

* * * * *